(12) United States Patent
Shao et al.

(10) Patent No.: US 12,120,179 B2
(45) Date of Patent: Oct. 15, 2024

(54) METHODS AND INTERNET OF THINGS (IOT) SYSTEMS FOR OPERATION AND MANAGEMENT OF SMART GAS DATA CENTERS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/464,320

(22) Filed: Sep. 11, 2023

(65) Prior Publication Data
US 2023/0421638 A1   Dec. 28, 2023

(30) Foreign Application Priority Data
Aug. 8, 2023   (CN) .......................... 202310989813.7

(51) Int. Cl.
*H04L 67/1097* (2022.01)
*G16Y 10/35* (2020.01)
(Continued)

(52) U.S. Cl.
CPC .......... *H04L 67/1097* (2013.01); *G16Y 10/35* (2020.01); *G16Y 40/35* (2020.01); *H04L 67/1004* (2013.01); *H04L 67/1095* (2013.01)

(58) Field of Classification Search
CPC ............ H04L 67/1097; H04L 67/1004; H04L 67/1095; G16Y 10/35; G16Y 40/35; Y02P 90/02
See application file for complete search history.

(56) References Cited

U.S. PATENT DOCUMENTS

| 10,565,058 B1 * | 2/2020 | Meiri | .................. G06F 11/1461 |
| 11,023,433 B1 * | 6/2021 | Datta | .................... G06F 16/219 |

(Continued)

FOREIGN PATENT DOCUMENTS

| CN | 106100801 A | 11/2016 |
| CN | 106484331 A | 3/2017 |

(Continued)

OTHER PUBLICATIONS

Notification to Grant Patent Right for Invention in Chinese Application No. 202310989813.7 mailed on Oct. 20, 2023, 7 pages.

(Continued)

*Primary Examiner* — Ramy M Osman
(74) *Attorney, Agent, or Firm* — METIS IP LLC

(57) ABSTRACT

The embodiments of the present disclosure provide a method and an Internet of Things (IoT) system for operation and management of a smart gas data center. The method is implemented by a smart gas management platform, comprising: obtaining gas data to be stored and downstream user features corresponding to the gas data to be stored; determining a data redundancy level of the gas data to be stored based on the gas data to be stored and the downstream user features; generating redundant data blocks of the gas data to be stored based on the data redundancy level; and storing the gas data to be stored and the redundant data blocks in at least one target region of the smart gas data center.

5 Claims, 5 Drawing Sheets

(51) Int. Cl.
    *G16Y 40/35*   (2020.01)
    *H04L 67/1004*   (2022.01)
    *H04L 67/1095*   (2022.01)

(56) References Cited

U.S. PATENT DOCUMENTS

| | | | |
|---|---|---|---|
| 11,436,097 B1* | 9/2022 | Kumar | G06F 16/1824 |
| 2007/0186141 A1* | 8/2007 | Hashimoto | H04L 1/0061 |
| | | | 714/763 |
| 2012/0059827 A1* | 3/2012 | Brittain | G06F 16/215 |
| | | | 707/E17.014 |
| 2014/0279895 A1* | 9/2014 | Mehra | G06F 11/1088 |
| | | | 707/634 |
| 2016/0105509 A1* | 4/2016 | Iizawa | H04L 67/1095 |
| | | | 709/219 |
| 2016/0371145 A1* | 12/2016 | Akutsu | H04L 67/1097 |
| 2018/0232166 A1* | 8/2018 | Massey, Jr. | G06F 11/2005 |
| 2020/0401317 A1* | 12/2020 | Lin | G06F 3/067 |
| 2022/0284033 A1* | 9/2022 | Stolze | G06F 16/27 |
| 2022/0284034 A1* | 9/2022 | Stolze | G06F 11/3476 |
| 2023/0222384 A1* | 7/2023 | Shao | G06Q 50/06 |
| | | | 702/187 |
| 2023/0409008 A1* | 12/2023 | Shao | G06Q 50/06 |
| 2023/0412705 A1* | 12/2023 | Shao | H04L 67/60 |
| 2023/0421457 A1* | 12/2023 | Shao | G06Q 10/04 |
| 2023/0421638 A1* | 12/2023 | Shao | H04L 67/1097 |

FOREIGN PATENT DOCUMENTS

| | | |
|---|---|---|
| CN | 110348528 A | 10/2019 |
| CN | 111258500 A | 6/2020 |
| CN | 114416437 A | 4/2022 |
| CN | 115186759 A | 10/2022 |
| CN | 115470041 A | 12/2022 |
| CN | 115907264 A | 4/2023 |
| CN | 116006908 A | 4/2023 |
| CN | 116091080 A | 5/2023 |
| JP | 2013030035 A | 2/2013 |

OTHER PUBLICATIONS

First Office Action in Chinese Application No. 202310989813.7 mailed on Sep. 9, 2023, 18 pages.

Li, Yong et al., Application Research on Gas Intelligent Inspection System, Surveying and Mapping Bulletin, 2012, 4 pages.

Shi, Rongfeng, Research on Optimization of Small File Access in Non-Cdn Environment, China's Outstanding Master's Thesis Full-text Database (Information Technology Series), 2017, 94 pages.

Chen, Zhenjia et al., Blockchain Structure Electromagnetic Spectrum Database in Distributed Cognitive Radio Monitoring System, IEEE Transactions on Cognitive Communications and Networking, 8(4): 1647-1664, 2022.

Wu, Suzhen et al., DAC: Improving Storage Availability with Deduplication-Assisted Cloud-of-Clouds, Future Generation Computer Systems, 2016, 9 pages.

* cited by examiner

METHODS AND INTERNET OF THINGS (IOT) SYSTEMS FOR OPERATION AND MANAGEMENT OF SMART GAS DATA CENTERS

CROSS-REFERENCE TO RELATED APPLICATIONS

This application claims priority to Chinese Patent Application No. 202310989813.7, filed on Aug. 8, 2023, the entire content of which is hereby incorporated by reference.

TECHNICAL FIELD

The present disclosure relates to the field of data management, and in particular, to a method and an Internet of Things (IoT) system for operation and management of a smart gas data center.

BACKGROUND

The operation of the gas management system relies on the interaction, transmission and analysis of various gas data, thus providing guarantee for the normal operation of the gas system. With the continuous development of the gas business, the amount of gas data is getting larger and larger, and it often takes a lot of time to process the gas data. In addition, if the data center fails, it will directly lead to the unavailability of gas data, which will affect the operation of the gas system.

Therefore, it is desirable to provide a method for operation and management of a smart gas data center to improve data management efficiency, enhance the stability of the data center, and ensure the daily operation of the data center.

SUMMARY

One or more embodiments of the present disclosure provide a method for operation and management of a smart gas data center. The method may be implemented by a smart gas management platform, comprising: obtaining gas data to be stored and downstream user features corresponding to the gas data to be stored; determining a data redundancy level of the gas data to be stored based on the gas data to be stored, the downstream user features, and load distribution features; generating redundant data blocks of the gas data to be stored based on the data redundancy level; and storing the gas data to be stored and the redundant data blocks in at least one target region of the smart gas data center.

One of the embodiments of the present disclosure provides an IoT system for operation and management of a smart gas data center. The IoT system may implement the method for operation and management of the smart gas data center, comprising: obtaining gas data to be stored and downstream user features corresponding to the gas data to be stored; determining a data redundancy level of the gas data to be stored based on the gas data to be stored, the downstream user features, and load distribution features; generating redundant data blocks of the gas data to be stored based on the data redundancy level; and storing the gas data to be stored and the redundant data blocks in at least one target region of the smart gas data center.

One or more embodiments of the present disclosure provide a device for operation and management of a smart gas data center, comprising a processor configured to implement the method for operation and management of the smart gas data center.

One or more embodiments of the present disclosure provide a non-transitory computer-readable storage medium, comprising computer instructions that, when read by a computer, direct the computer to perform the method for operation and management of the smart gas data center.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein.

DETAILED DESCRIPTION

Figure 1:
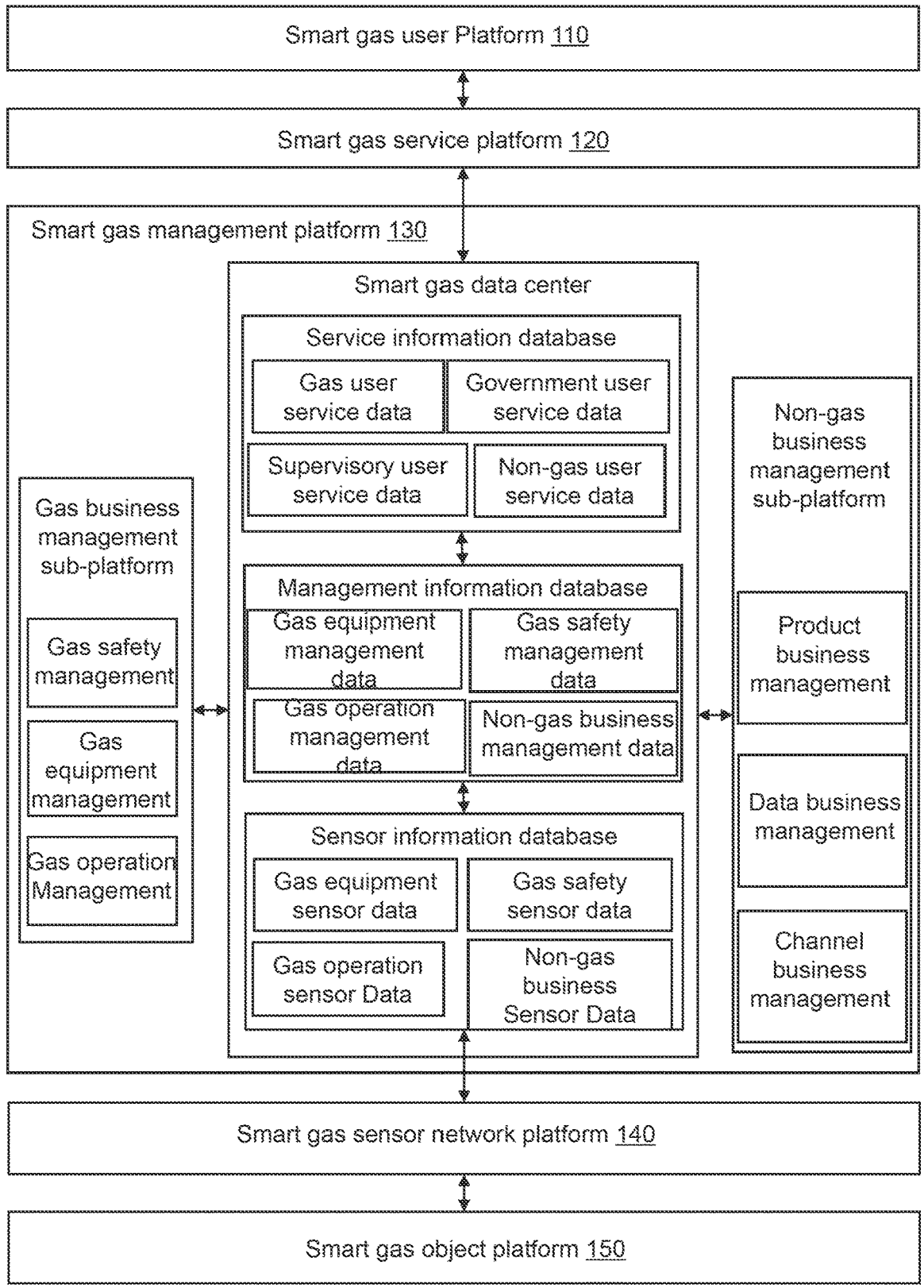
FIG. 1 is schematic diagram illustrating a platform structure of an IoT system for operation and management of a smart gas data center according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is schematic diagram illustrating an exemplary platform structure of an IoT system for operation and management of a smart gas data center according to some embodiments of the present disclosure. The IoT system for operation and management of the smart gas data center in the embodiments of the present disclosure will be described in detail below. It should be noted that the following embodiments are only used to explain the present disclosure, and do not constitute a limitation to the present disclosure.

In some embodiments, as shown in FIG. 1, an IoT system 100 for operation and management of a smart gas data center may include a smart gas user platform 110, a smart gas service platform 120, a smart gas management platform 130, a smart gas sensor network platform 140, and smart gas object platform 150 which are connected in sequence.

The smart gas user platform refers to a platform for interacting with users. In some embodiments, the smart gas user platform may be configured as a terminal device.

The smart gas service platform refers to a platform for communicating user needs and control information. The smart gas management platform may obtain downstream user features from the smart gas service platform, and send the downstream user features to the smart gas data center of the smart gas management platform.

The smart gas management platform refers to a platform that coordinates and harmonizes the connection and collaboration between the functional platforms and converge all the information of the IoT, and that provides perception management and control management functions for the IoT operation system.

In some embodiments, the smart gas management platform may include a gas business management sub-platform, a non-gas business management sub-platform, and the smart gas data center.

The gas business management sub-platform refers to a platform for processing business information related to gas. In some embodiments, the gas business management sub-platform may include, but is not limited to, a gas safety management module, a gas equipment management module, and a gas operation management module. The gas business management sub-platform may analyze and process gas business through the aforementioned management modules.

The non-gas business management sub-platform refers to a platform for processing business information not related to gas. In some embodiments, the non-gas business management sub-platform may include, but is not limited to, a product business management module, a data business management module, and a channel business management module. The non-gas business management sub-platform may analyze and process non-gas business through the aforementioned management modules.

The smart gas data center may be configured to store and manage all the operation information of the IoT system 100 for operation and management of the smart gas data center. In some embodiments, the smart gas data center may be configured as a storage device for storing data related to gas data, or the like, e.g., the downstream user features, the gas data level, etc.

In some embodiments, the smart gas data center may include a service information database, a management information database, and a sensor information database.

The service information database may include gas user service data, government user service data, supervisory user service data, and non-gas user service data.

The management information database may include gas equipment management data, gas safety management data, gas operation management data, and non-gas business management data.

The sensor information database may include gas equipment sensor data, gas safety sensor data, gas operation sensor data, and non-gas business sensor data.

In some embodiments, the smart gas management platform may perform information interaction with the smart gas service platform and the smart gas sensor network platform, respectively, through the smart gas data center. For example, the smart gas data center may send the gas data level to the smart gas service platform. As another example, the smart gas data center may send an instruction for obtaining the gas data level to the smart gas sensor network platform to obtain data related to the gas data level.

The smart gas sensor network platform may be a functional platform for managing sensor communication. In some embodiments, the smart gas sensor network platform may realize the functions of perception information sensor communication and control information sensor communication.

The smart gas object platform may be a functional platform for perception information generation and control information execution.

In some embodiments of the present disclosure, a closed loop of information operation may be formed between the smart gas object platform and the smart gas user platform based on the IoT system for operation and management of the smart gas data center, and coordinated and regular operation may be performed under the unified management of the smart gas management platform, thereby realizing informatization and intelligence of data management.

Figure 2:
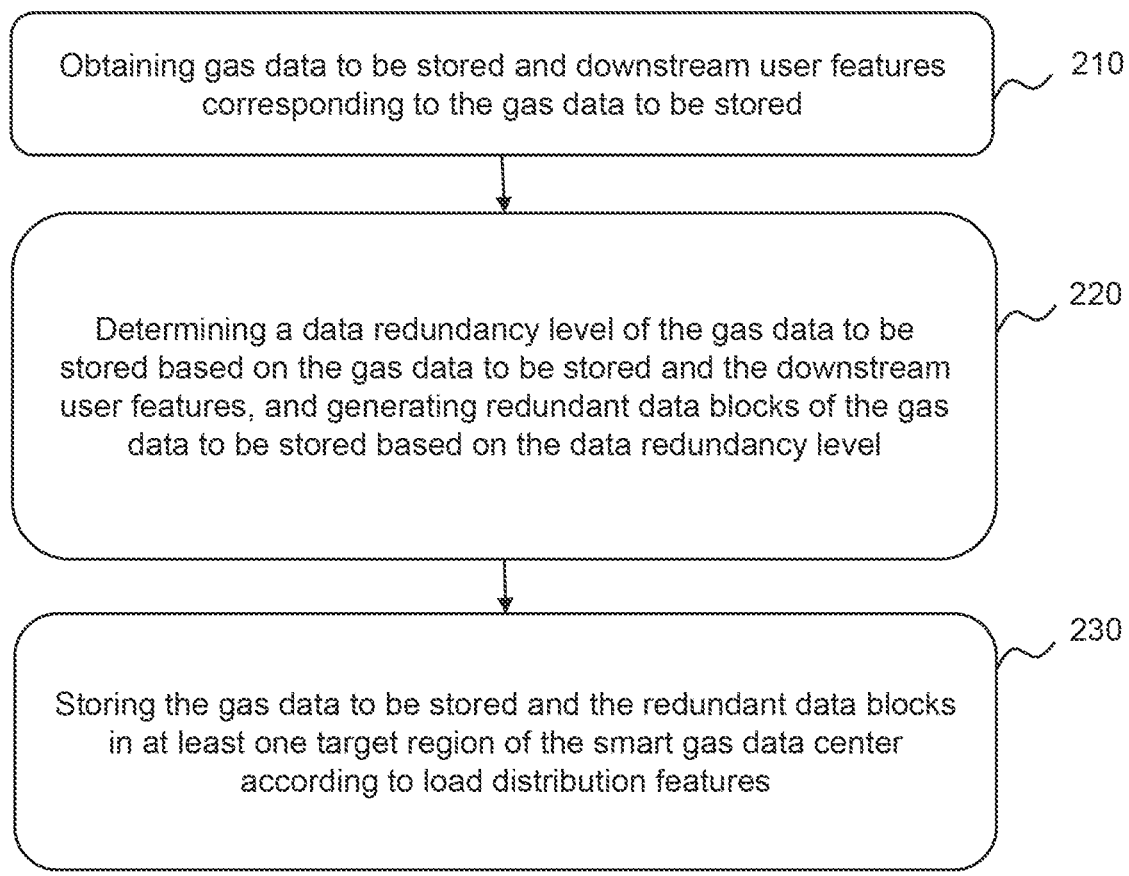
FIG. 2 is a flowchart illustrating an exemplary method for operation and management of a smart gas data center according to some embodiments of the present disclosure.

FIG. 2 is a flowchart illustrating an exemplary method for operation and management of a smart gas data center according to some embodiments of the present disclosure. As shown in FIG. 2, a process 200 may include the following operations. In some embodiments, the process 200 may be implemented by a platform of the IoT system for operation and management of the smart gas data center.

In 210, gas data to be stored and downstream user features corresponding to the gas data to be stored may be obtained.

The gas data to be stored refers to data related to gas. The gas data to be stored may be the data obtained by monitoring gas preparation, transmission or use process, etc.

The downstream user features refer to features related to gas users. The downstream user features may include a frequency of gas demand changes, a count of user requests, gas consumption of users, and nature of users. The frequency of gas demand changes refers to a frequency and a count of the gas demand changes of the users. The count of user requests refers to a count of times of a user submitting a gas work order. The nature of users refers to a type of the users, e.g., civilian use or commercial use.

A corresponding relationship may exist between the gas data to be stored and the downstream user features. Merely by way of example, different gas data to be stored may correspond to different downstream user features, and the downstream user features may be determined based on a source of the gas data to be stored. For example, if the gas data to be stored comes from a gas user A, the downstream user features corresponding to the gas data to be stored may be determined based on features of the gas user A.

In some embodiments, the downstream user features may be obtained through the smart gas user platform. The users may upload the data related to gas through the smart gas user platform. The gas data to be stored may be obtained through the smart gas object platform.

In 220, a data redundancy level of the gas data to be stored may be determined based on the gas data to be stored and the downstream user features, and redundant data blocks of the gas data to be stored may be generated based on the data redundancy level.

In some embodiments, when the gas data to be stored is stored, the smart gas management platform may divide the gas data to be stored into at least one data block, and calculate at least one redundant data block through a data redundancy algorithm based on the at least one data block. The smart gas management platform may store the at least one data block and the at least one redundant data block in at least one storage node of the smart gas data center. The data redundancy algorithm may be an Erasure-Code (EC) algorithm, a count N of data blocks may be an even number, and a count M of redundant data blocks may be 2-4.

In the process of data storage, a data volume stored in each data block is usually fixed. In some embodiments, the count of data blocks may be determined based on a total data volume of the gas data to be stored and a preset size of data blocks. The preset size of data blocks may be generally determined based on prior experience. Merely by way of example, the preset size of data blocks may be 64 M, 128 M, 256 M, or 512 M, etc.

In some embodiments, the count of the redundant data blocks may be determined based on the count of data blocks and a data redundancy ratio.

The data redundancy level refers to features of a quantitative relationship between the data blocks and the redundant data blocks. In some embodiments, the data redundancy level may be represented by an integer value between 0-10, and the higher the data redundancy level, the greater the count of redundant data blocks. The data redundancy level may also have other manifestations based on the actual situation.

The smart gas management platform may determine the data redundancy level in various ways based on the gas data to be stored and the downstream user features.

In some embodiments, the smart gas management platform may be configured to determine the data redundancy level based on a preset data redundancy level reference table. The reference table may include reference data types and reference user features, and reference data redundancy levels corresponding to the reference data types and the reference user features. The smart gas management platform may determine a type of the gas data to be stored, and determine the data redundancy level by querying the reference table based on the type of the gas data to be stored and the downstream user features.

In some embodiments, the smart gas data center may also determine the gas data level based on the gas data to be stored and the downstream user features, and determine the data redundancy level based on the of gas data level, an estimated retention time of the gas data to be stored, and an estimated access frequency of the gas data to be stored. More details may be found in FIG. 2 and related descriptions thereof.

In some embodiments, each data redundancy level may correspond to one data redundancy ratio. The data redundancy ratio refers to configuration of the count of data blocks and redundant data blocks. For example, the data ratio may be 8 data blocks with 2 redundant data blocks, 6 data blocks with 3 redundant data blocks, etc. In some embodiments, the smart gas management platform may determine the data redundancy ratio through a preset redundancy ratio table based on the data redundancy level. The redundancy ratio table may include data redundancy levels and data ratios corresponding to the data redundancy levels, which may be determined based on prior experience or historical data.

In some embodiments, the smart gas management platform may determine the data redundancy ratio based on the data redundancy level, and generate a corresponding count of data redundant blocks through the data redundancy algorithm based on the data redundancy ratio.

In 230, the gas data to be stored and the redundant data blocks may be stored in at least one target region of the smart gas data center according to load distribution features.

The at least one target region refers to at least one storage region of the smart gas data center. The at least one storage region may include one or more sub-data centers of an active-active data center. In some embodiments, the smart gas management platform may determine the target region based on the load distribution features. More descriptions may be found in the related descriptions in FIG. 5 of the present disclosure.

In some embodiments, the smart gas data center may include at least one sub-data center. Each sub-data center may store the data blocks and the redundant data blocks corresponding to the data to be stored, and each sub-data center may include at least one storage node. The storage node may be configured to store data.

The smart gas data center may operate in the form of the active-active data center. The active-active data center may include a first data center and a second data center, i.e., two sub-data centers communicating with each other. The first data center and the second data center may respectively store and process different data. The smart gas management platform may store at least one data block and at least one redundant data block corresponding to the gas data to be stored in the two data centers, respectively. For example, if the at least one data block is stored in the first data center, the at least one redundant data block corresponding to the at least one data block may be stored in the second data center, or the at least one data block may be stored in the second data center, and the at least one redundant data block may be stored in the first data center. In this way, when one of the data centers fails and the data blocks cannot be read, the data may be restored through the redundant data blocks in the other data center, thereby ensuring the stability of the data stored in the smart gas data center.

In some embodiments, the first data center may also be referred to as a primary data center, and the second data center may also be referred to as a secondary data center.

The load distribution features refer to criteria of different sub-data centers for receiving data in a gas data processing task. The smart gas center may allocate different data to different sub-data centers for processing according to the load distribution features of different data centers.

The smart gas management platform may obtain the load distribution features in various ways. In some embodiments, the load distribution features may be determined through preset rules. For example, the preset rules may include a data type, and the load distribution features may be that the first data center receives gas pipeline network infrastructure data and gas pipeline network maintenance data, and the second data center receives gas system operation data, etc. The preset rules may also include other features, which may be set based on actual needs.

In some embodiments, the load distribution features may be determined based on data processing features and total risk of failure. More details may be found in FIG. 5 and related descriptions thereof.

In some embodiments, the smart gas management platform may store the at least one data block and the at least one redundant data block corresponding to the gas data to be stored according to the load distribution features, and store the at least one data block and the at least one redundant data block in the at least one storage node of different sub-data centers.

In some embodiments of the present disclosure, the data may be processed and stored by combining the multi-core data center processing technology and the EC algorithm, thereby improving the efficiency and the security of data storage, and ensuring normal operation of the smart gas platform.

Figure 3:
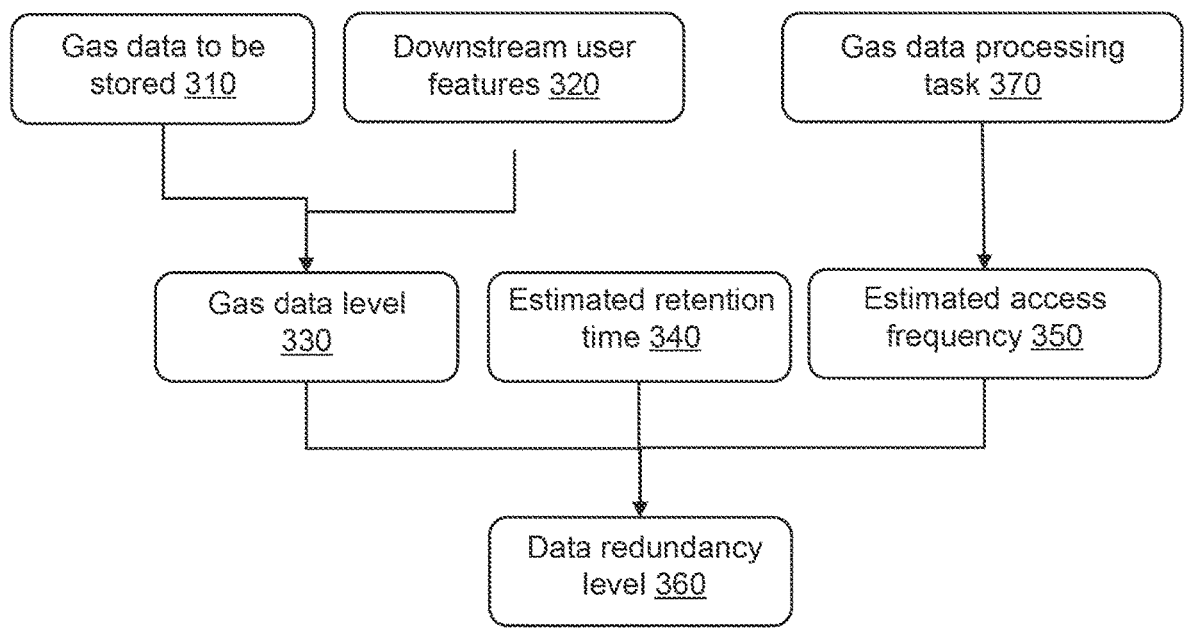
FIG. 3 is a schematic diagram illustrating a determination of a data redundancy level according to some embodiments of the present disclosure.

FIG. 3 is a schematic diagram illustrating a determination of a data redundancy level according to some embodiments of the present disclosure.

In some embodiments, the smart gas data center may determine the gas data level based on the gas data to be stored and the downstream user features; determine the data redundancy level based on the gas data level, the estimated retention time of the gas data to be stored, and the estimated access frequency of the gas data to be stored, the estimated access frequency being related to a distribution of data processing features within a first preset time, and the data processing features being determined based on the gas data processing task.

The gas data level refers to a criterion used to measure an importance of the gas data to be stored. In some embodiments, the gas data level may be represented by a number between 0-10, and the larger the number, the higher the gas data level.

The smart gas management platform may determine the gas data level in various ways.

In some embodiments, the smart gas data center may determine the gas data level by querying a gas data level reference table based on the gas data to be stored and the downstream user features corresponding to the gas data to be stored. The gas data level reference table may include at least one reference feature set and a reference gas data level corresponding to each reference feature set. The at least one reference feature set may include reference gas data and reference user features. The gas data level reference table may be determined based on historical data.

In some embodiments, the gas data level may also be determined by manual evaluation.

In some embodiments, the gas data level may also be determined based on the gas data to be stored, a data access frequency distribution, and the downstream user features. More details may be found in FIG. 4 and related descriptions thereof.

In some embodiments, the smart gas data center may determine the data redundancy level based on a relationship table between the gas data level, the estimated retention time of the gas data to be stored, the estimated access frequency of the gas data to be stored, and the data redundancy level. In some embodiments, the smart gas data center may pre-record and save tables related to different gas data levels corresponding to different data redundancy levels, the estimated retention time, and the estimated access frequency, or the like. The smart gas data center may determine the data redundancy level by looking up the table based on the gas data level, the estimated retention time of the gas data to be stored, and the estimated access frequency of the gas data to be stored.

The estimated retention time refers to an estimated time period for which the gas data to be stored needs to be retained in the data center. The estimated retention time may be determined by manual preset.

The estimated access frequency refers to a frequency at which the gas data to be stored is expected to be accessed. The estimated access frequency may be related to a distribution of data processing features within a preset time period.

The data processing features refer to features of gas data to be stored related to the gas data processing task. The data processing features may be related to a type of gas data to be stored, and at least include data volumes of different types of gas data to be stored. The distribution of the data processing features refers to a distribution of a proportion of a processing volume of each data type required for the gas data processing task. The smart gas management platform may predetermine the data processing features according to task requirements of the gas data processing task.

For example, according to the distribution of the data processing features of the gas data processing task in the preset time period, it is found that a processed volume of A type data accounts for 50% of the total data volume, a processed volume of B type data accounts for 30% of the total data volume, and a processed volume of C type data accounts for 20% of the total data volume, then when current gas data to be stored is the A type data, it may be considered to have a higher estimated access frequency.

In some embodiments, the data redundancy level may be determined according to a preset algorithm. For example, the data redundancy level may be determined by the following formula. The data redundancy level=$k_1$*the gas data level+$k_2$*the estimated retention time+$k_3$*the estimated access frequency, where $k_1$, $k_2$, and $k_3$ may be set according to actual measurement requirements. $k_1$, $k_2$, and $k_3$ may all be natural numbers greater than 0.

In some embodiments, the data redundancy level may be positively correlated with the gas data level, the estimated retention time, and the estimated access frequency.

In some embodiments of the present disclosure, the data redundancy level may be determined by analyzing various data related to the gas and the users, the data may be more reasonably classified and stored, and a large volume of data may be efficiently and quickly organized and stored, thereby improving the operation performance of the smart gas platform.

Figure 4:
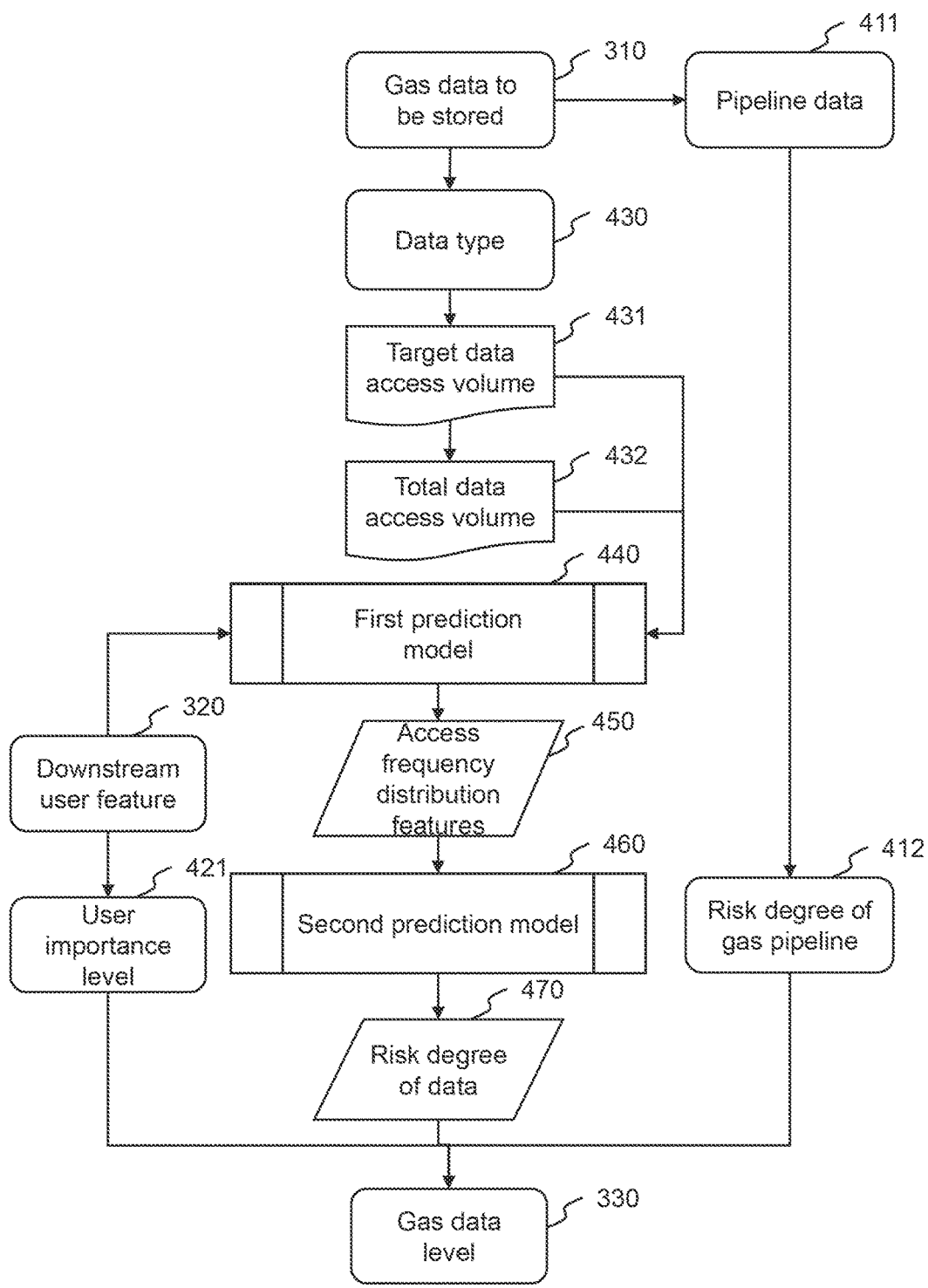
FIG. 4 is a schematic diagram illustrating a determination of a gas data level according to some embodiments of the present disclosure.

FIG. 4 is a schematic diagram illustrating a determination of a gas data level according to some embodiments of the present disclosure.

In some embodiments, a gas data level 330 may also be correlated with a data type 430 of gas data to be stored 310.

In some embodiments, the smart gas management platform may determine the data type 430 of the gas data to be stored 310; predict access frequency distribution features 450 of the gas data to be stored 310 based on the data type 430; and determine the gas data level 330 based on the gas data to be stored 310, the access frequency distribution features 450, and downstream user features 320.

More details regarding the gas data to be stored 310 and the downstream user features 320 may be found in FIG. 2 and related descriptions thereof.

The data type 430 refers to a type of the gas data to be stored 310. The data type 430 may include infrastructure data, operation data, maintenance data, or the like. The data type 430 may be obtained according to the gas data to be stored 310.

The access frequency distribution features 450 refer to a probability distribution of access frequencies of different data types of the gas data to be stored within a certain time period. The access frequency distribution features may include at least one frequency distribution interval and a probability corresponding to the at least one frequency distribution interval. For example, the at least one access frequency distribution interval may be represented by $f_1, f_2, f_3, \ldots, f_n$, and interval division may be determined based on manual setting; the corresponding access probability may be represented by $p_1, p_2, \ldots, p_n$.

The smart gas management platform may predict the access frequency distribution features 450 in various ways. In some embodiments, the smart gas management platform may predict the access frequency distribution features 450 based on historical access situations of at least one data type of the gas data to be stored. For example, in a time period including two units of time, for the access frequency interval (10, 20, 30), if a total data access volume in the first unit time is 120 times, and the gas data to be stored is accessed for 30 times, the access frequency of the gas data to be stored may be 30/1 (unit time)=30, and the access probability may be 30/120=25%; if a total data access volume in the second unit time is 100 times, and the gas data to be stored is accessed 10 times, the access frequency of the gas data to be stored may be 10/1 (unit time)=10, and the access probability may be 10/100=10%. If there is no access frequency of 20 in the aforementioned time period, then the access frequency distribution features corresponding to the access frequency interval (10, 20, 30) within the time period may be (10%, 0, 25%).

In some embodiments, the smart gas management platform may determine a target data access volume 431 of data with the data type 430 within a second preset time based on the data type 430, and determine a total data access volume 432 of all data within the second preset time; and determine the access frequency distribution features 450 through a 440 based on the total data access volume 432, the target data access volume 431, and the downstream user features 320.

The second preset time refers to a time period of obtaining the target data access volume. The second preset time may be obtained based on manual setting.

In some embodiments, the second preset time may be the same as the first preset time.

The target data access volume refers to an access volume of data with a corresponding data type within the second preset time. The smart gas management platform may determine the target data access volume based on historical access situations of the gas data to be stored with the corresponding data type.

The total data access volume refers to an access volume of all data within the second preset time. The smart gas management platform may determine the total data volume based on the historical access situations.

The first prediction model 440 may be a machine learning model, e.g., a Deep Neural Networks (DNN) model, a Recurrent Neural Network (RNN) model, or the like, or any combination thereof.

In some embodiments, an input of the first prediction model 440 may include the total data access volume 432, the target data access volume 431, and the downstream user features 320 corresponding to the gas data to be stored 310, and an output of the first prediction model 440 may include the access frequency distribution features 450 in a future time period. More descriptions regarding the downstream user features 320 may be found in FIG. 2 and related descriptions thereof.

In some embodiments, the first prediction model may be obtained by training first training samples with first labels.

In some embodiments, the first training sample may include a sample data total access volume, a sample target data type access volume, and downstream user features corresponding to sample gas data to be stored.

In some embodiments, the labels for training may include probabilities corresponding to a plurality of access frequency intervals, and the labels may be obtained through manual labeling. The labels of the intervals whose access probability is not 0 may be 1, and the labels of the intervals whose access probability is 0 may be 0. For example, in a historical time period including two sample unit times, for the sample access frequency interval (10, 20, 30), if a total data access volume in the first sample unit time is 120 times, and the sample gas data to be stored is accessed for 30 times, the sample access frequency may be 30/1 (unit time)=30, and the sample access probability may be 30/120=25%; if a total data access volume in the second sample unit time is 100 times, and the sample gas data to be stored is accessed for 10 times, the sample access frequency may be 10/1 (unit time)=10, and the sample access probability may be 10/100=10%. There is no case where the access frequency is 20, and then the label corresponding to the sample access frequency interval (10, 20, 30) may be (1, 0, 1).

In some embodiments of the present disclosure, the access data and the downstream user features may be processed through the first prediction model, and the relationship between the access frequency distribution features and the access data may be obtained by finding patterns from a large volume of access data based on the self-learning capacity of the machine learning model, thereby improving the accuracy and the efficiency of determining the access frequency distribution features.

In some embodiments, the smart gas management platform may determine the gas data level in various ways based on the gas data to be stored 310, the access frequency distribution features 450, and the downstream user features 320.

In some embodiments, the smart gas management platform may pre-record and save a table related to a corresponding relationship between at least one gas data to be stored 310, at least one access frequency distribution feature 450, at least one downstream user feature 320, and at least one gas data level 330. The smart gas management platform may determine the gas data level 330 by looking up the table based on the gas data to be stored 310, the access frequency distribution features 450, and the downstream user features 320.

In some embodiments, the smart gas management platform may determine a user importance level 421 based on the downstream user features 320; determine a risk degree 412 of a gas pipeline based on pipeline data 411; determine a risk degree 470 of data based on the access frequency distribution features 450; and determine the gas data level 330 based on the user importance level 421, the risk degree 412 of the gas pipeline, and the risk degree 470 of data.

The user importance level 421 refers to a level of user importance. In some embodiments, the smart gas management platform may pre-record and save a table related to a corresponding relationship between the at least one downstream user feature 320 and at least one user importance level 421 in the historical data. The smart gas safety management platform may determine the user importance level 421 by looping up the table, etc., based on the downstream user features 320.

The pipeline data 411 refers to data related to pipeline features. The pipeline data 411 may include service life of a gas pipeline, a count of times of processing the gas pipeline (e.g., maintenance, adjustment, etc.), a depletion rate of the gas pipeline, or the like. The pipeline data 411 may be obtained by accessing the smart gas object platform.

The risk degree 412 of the gas pipeline refers to a probability of pipeline abnormalities. In some embodiments, the smart gas management platform may construct query feature vectors based on the pipeline data 411, and determine the risk degree 412 of the gas pipeline by performing vector matching based on a vector database. The vector database may include a plurality of reference feature vectors and reference risk degrees of pipelines corresponding to the reference feature vectors. The feature vectors may be constructed based on historical pipeline data.

In some embodiments, the smart gas management platform may determine reference feature vectors satisfying a preset condition in the vector database based on the query feature vectors, and determine the reference feature vectors satisfying the preset condition as associated feature vectors. The preset condition refers to a determination condition for determining the associated feature vectors. In some embodiments, the preset condition may include that a vector distance is smaller than a distance threshold, the vector distance is minimal, or the like.

In some embodiments, the smart gas management platform may determine the final risk degree 412 of the gas pipeline based on the reference risk degrees of the gas pipeline corresponding to the associated feature vectors.

The risk degree 470 of data refers to a probability of data abnormalities. The data abnormalities may include a task failure, a storage failure, or the like. The task failure may include that a task processing time involving the gas data to be stored exceeds a standard, a task involving the gas data to be stored crashes, or other problems involving the processing of the gas data to be stored; and the storage failure may include data loss, data storage failure, or the like.

The smart gas management platform may determine the risk degree of data in various ways.

In some embodiments, the smart gas management platform may pre-record and save a table related to the at least one risk degree 470 of data corresponding to the at least one access frequency distribution feature 450. The smart gas management platform may determine the risk degree 470 of data by looking up the table, etc., based on the access frequency distribution features 450.

In some embodiments, the smart gas management platform may determine the risk degree 470 of data through a second prediction model 460 based on the access frequency distribution features 450.

The second prediction model 460 may be a machine learning model, e.g., a DNN model, an RNN model, or the like, or any combination thereof.

In some embodiments, an input of the second prediction model 460 may include the access frequency distribution features 450. In some embodiments, the input of the second prediction model 460 may also include the count of data blocks, the count of redundant data blocks, ae distribution of data in a storage space, and an access type, and an output of the second prediction model 460 may include the risk degree 470 of data.

The access type may include read-only, write-only, and read-write. More descriptions regarding the count of data blocks and the count of redundant data blocks may be found in FIG. 2 and related descriptions thereof. The distribution of data in the storage space refers to a distribution of divided gas data to be stored and redundant data blocks in at least one sub-data center. More descriptions regarding the redundant data blocks may be found in FIG. 2 and related descriptions thereof. The smart gas management platform may obtain the distribution and the access type of data in the storage space by accessing the smart gas data center.

In some embodiments, the second prediction model may be obtained by training with second training samples with second labels.

In some embodiments, the second training samples may include sample gas data to be stored and sample access frequency distribution features corresponding to the sample gas data to be stored, and the second labels refer to a frequency of abnormity of the sample gas data to be stored. The second labels may be obtained based on historical abnormal data of the smart gas data center.

When an input of the second prediction model also includes the count of the data blocks, the count of the redundant data blocks, the distribution of data in the storage space, and the access type, the second training samples may also include a count of sample data blocks, a count of sample redundant data blocks, a distribution of sample data in the storage space, and a sample access type.

In some embodiments of the present disclosure, the access frequency distribution features may be processed through the second prediction model, and the relationship between the access frequency distribution features and the risk degree of data may be obtained by finding patterns from a large volume of access frequency distribution features based on the self-learning capacity of the machine learning model, thereby improving the accuracy and the efficiency of determining the risk degree of data.

The smart gas safety management platform may determine the gas data level 330 in various ways based on the user importance level 421, the risk degree 412 of the gas pipeline, and the risk degree 470 of data. The specific ways may be selected based on actual needs.

In some embodiments, the gas data level 330 may be a weighted sum of the user importance level 421, the risk degree 412 of the gas pipeline, and the risk degree 470 of data. A weight of the weighted sum may be determined based on prior knowledge and historical data.

In some embodiments, the gas data level 330 may be determined through a parametric training model.

The parameter training model may be a machine learning model, e.g., a DNN model, an RNN model, or the like, or any combination thereof.

In some embodiments, an input of the parameter training model may include the user importance level 421, the risk degree 412 of the gas pipeline, and the risk degree 470 of data, and an output of the parameter training model may include the gas data level 330.

In some embodiments, the parameter training model may be obtained by training based on third training samples with third labels. The third training samples may include the user importance level, the risk degree of the gas pipeline, and the risk degree of data determined by existing historical data, and the third labels may include manually labeled gas data level. The gas data level may be determined based on a subsequent failure frequency, an impact of failure, and recovery cost. The higher the failure frequency of the gas data to be stored, the greater the impact of failure, and the higher the recovery cost, the higher the corresponding gas data level.

If the parameter training model is a perceptual network, the weight of the weighted sum may be determined based on parameters of the parameter training model. Merely by way of example, an output of the perceptual network may include the gas data level and the parameters of the parameter training model. The smart gas management platform may determine the weight of the weighted sum based on the parameters output by the perceptual network, e.g., the output parameters may be directly used as the weight.

In some embodiments of the present disclosure, the gas data level may be determined based on the user importance level, the risk degree of the gas pipeline, and the risk degree of data, and features that affect the gas data level may be more accurately located, so that the determined gas data level may be more accurate, and subsequent data storage and management may be more scientifically performed.

In some embodiments of the present disclosure, the data access frequency distribution may be predicted based on the data type, and the data access frequency distribution may be predicted more accurately; the gas data level may be determined based on the gas data to be stored, the data access frequency distribution, and the downstream user features, and the gas data level may be determined by comprehensively considering various indicators, so that the determined gas data level may be more accurate, and subsequent data storage and management may be more scientifically performed.

Figure 5:
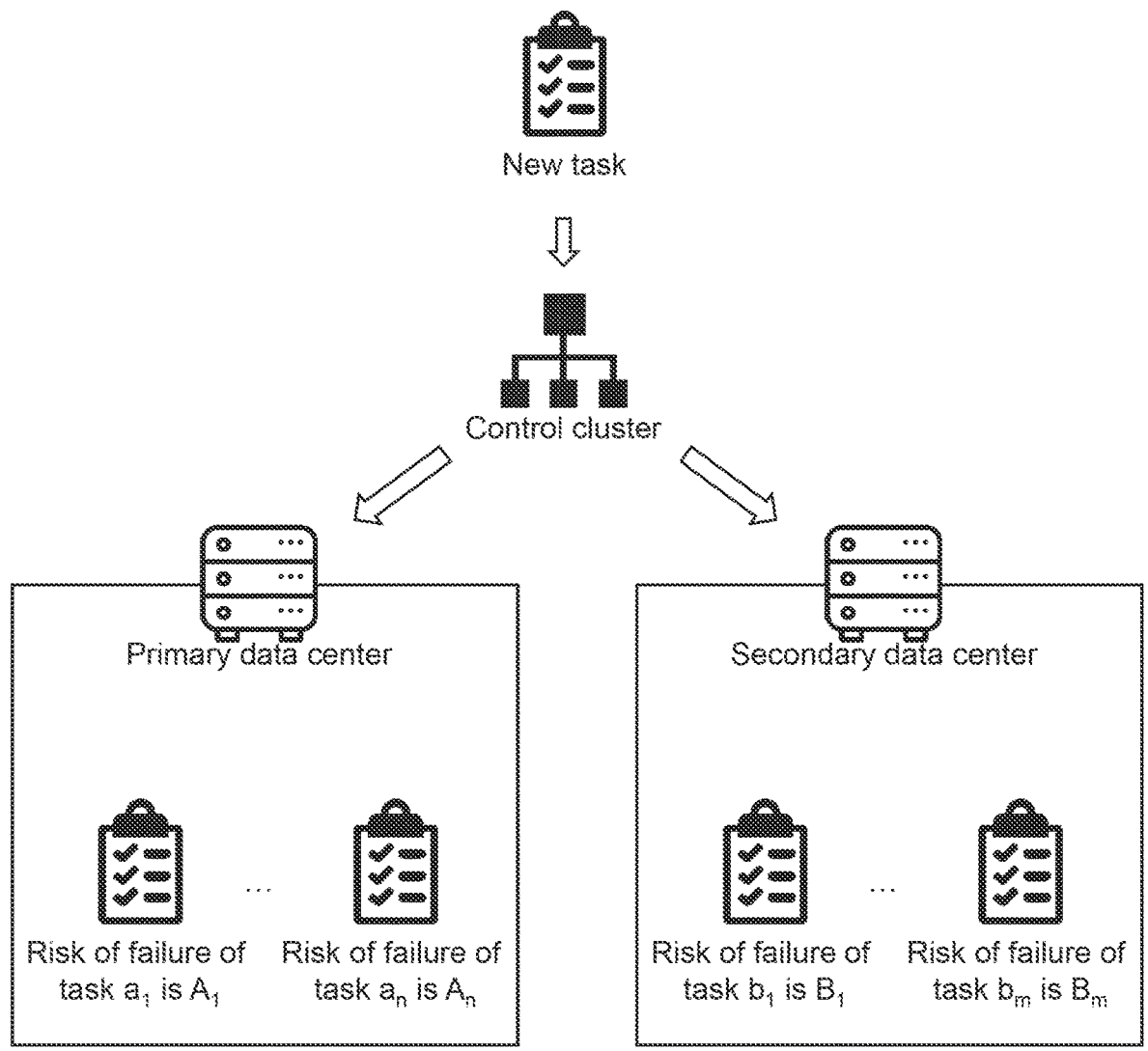
FIG. 5 is a schematic diagram illustrating a determination of load distribution features according to some embodiments of the present disclosure.

FIG. 5 is a schematic diagram illustrating a determination of load distribution features according to some embodiments of the present disclosure.

In some embodiments, the smart gas management platform may determine load distribution features of a control cluster of the smart gas data center.

The control cluster refers to a general term for at least one control node. The control node refers to a node used to access the smart gas data center and assign the gas data processing task. The assignment of the gas data processing task may include determining a data center for running the task, and a position of the gas data to be stored corresponding to the gas data processing task in the data center.

More descriptions regarding the load distribution features may be found in FIG. 2 and related descriptions thereof.

The smart gas management platform may determine the load distribution features-in various ways.

In some embodiments, the smart gas management platform may determine the load distribution features based on a strategy of balancing the gas data level. For example, the load distribution features may include that a degree of difference between a total gas data level and an average gas data level of at least one data center is less than a difference degree threshold. The average gas data level refers to an average value of the gas data level of at least one data block in the gas data center.

In some embodiments, the load distribution features may be related to data processing features and a total risk of failure. The total risk of failure may be determined based on the gas data level 330.

The data processing features refer to relevant features of the gas data to be stored included in the gas data processing task. The data processing features may include a total data volume and a data distribution (a data volume of each data type required for performing the gas processing task). The gas data processing task may include at least one storage of gas data to be stored. The smart gas management platform may preset and determine the data processing features based on task requirements of the gas processing task.

The total risk of failure refers to a sum of the failure probabilities of all levels of gas data in the gas data level distribution of the gas processing task. The failure probabilities refer to failure probabilities of all gas data under a certain gas data level.

The failure probabilities of all gas data under the gas data level may be obtained statistically based on historical failure information. For example, if there are No failures for the gas data at this gas data level, and then the gas data may be put into use again after the failures are repaired, and an average failure interval time may be a ratio of total operation time of the gas data to a count of failures. The total operation time of gas data may be a sum of duration of each operation (time for troubleshooting). The failure probabilities of all gas data under this gas data level may be a reciprocal of the average failure interval time.

In some embodiments, the smart gas management platform may determine the load distribution features based on a strategy of balancing the total risk of failure. The strategy of balancing the total risk of failure is to ensure that the risk of failure of each data center is balanced at a current time, i.e., a total load risk and an average task risk of each data center before the arrival of a new task, and after the arrival of the new tasks and allocation to the data center may be balanced on the whole. As shown in FIG. 5, $\Sigma_{i=1}^{n} A_i$ and $\Sigma_{j=1}^{m} B_j$ may maintain balance, and $$\frac{1}{n}\Sigma_{i=1}^{n}A_i \text{ and } \frac{1}{m}\Sigma_{j=1}^{m}B_j$$

may maintain balance. $\Sigma_{i=1}^{n} A_i$ represents a total load risk of all tasks in the primary data center, $\Sigma_{j=1}^{m} B_j$ represents a total load risk of all tasks in the secondary data center;

$$\frac{1}{n}\Sigma_{i=1}^{n}A_i$$

represents the average task risk of each task in the primary data center; and $$\frac{1}{m}\Sigma_{j=1}^{m}B_j$$

represents a total count of tasks in the primary data center, and m represents a total count of tasks in the secondary data center. Each task may correspond to a data storage, and each data storage may include storage of a set of data blocks and redundant data blocks of the gas data to be stored.

The total load risk refers to a sum of the total risk of failure of all tasks loaded in the data center. The average task risk refers to a ratio of the total load risk to a count of loaded tasks. For example, there may be two current data centers, a threshold of the difference degree between the total load risk and the average task risk may be set to 30%, and the difference degree refers to a ratio of a difference between the average task risk of different data centers to a maximum value. The current load situation may be represented by Table 1.

TABLE 1

| | Current load situation | | | | |
|---|---|---|---|---|---|
| | data center 1 | data center 2 | Difference | Difference degree | Threshold of difference degree |
| Count of tasks | 3 | 2 | — | — | — |
| Average task risk | 3.3 | 3.5 | 0.2 | 0.2/max{3.3, 3.5} = 6% | 30% |

TABLE 1-continued

| Current load situation | | | | |
|---|---|---|---|---|
| | data center 1 | data center 2 | Difference | Difference degree | Threshold of difference degree |
| Total task risk | 10 | 7 | 3 | 3/max{10, 7} = 30% | 30% |

The difference degree between the average task risk and the total task risk of the data center 1 and the data center 2 may be less than or equal to the corresponding threshold of the difference degree, and the risk of failure may be considered to be balanced.

As another example, the total risk of failure of task A is 4, if the task A is assigned to the data center 1, the load level may be represented in Table 2.

TABLE 2

| Assignment to data center 1 | | | | |
|---|---|---|---|---|
| | Data center 1 | Data center 2 | Difference | Difference degree | Threshold of difference degree |
| Count of tasks | 4 | 2 | — | — | — |
| Average task risk | 3.5 | 3.5 | 0 | 0/max{3.5, 3.5} = 0% | 30% |
| Total task risk | 14 | 7 | 7 | 7/max{14, 7} = 50% | 30% |

The difference degree of the total task risk of the data center 1 and the data center 2 may be 50%, which is greater than the corresponding risk threshold.

If the task A is assigned to the data center 2, the load level may be represented in Table 3.

TABLE 3

| Assignment to data center 2 | | | | |
|---|---|---|---|---|
| | Data center 1 | Data center 2 | Difference | Difference degree | Threshold of difference degree |
| Count of tasks | 3 | 3 | — | — | — |
| Average task risk | 3.3 | 3.7 | 0.2 | 0.2/max{3.3, 3.7} = 5% | 30% |
| Total task risk | 10 | 11 | 1 | 1/max{10, 11} = 9% | 30% |

The difference degree of the average task risk and the difference degree of the total task risk of the data center 1 and the data center 2 may be both less than the corresponding risk threshold. Therefore, assigning the task to the load center 2 may better balance the risk of failure.

In some embodiments, the smart gas management platform may determine at least one candidate data center based on the strategy of balancing the total risk of failure, and determine secondary read-write time of each candidate data center based on the data volume of the gas data to be stored, and finally, select the candidate data center with the least read-write time as a target assignment object, and assign the task to the target allocation object. The secondary read-write time refers to time spent on a single read-write. The secondary read-write time means a ratio of the data volume to read-write speed of the data center per second.

In some embodiments of the present disclosure, the load distribution features may be related to the data processing features and the total risk of failure, which may ensure that each data center equally assigns the risk of failure, and finally selects the candidate data center with the least read-write time as the target assignment object, thereby improving data processing efficiency and performance.

In some embodiments of the present disclosure, better load balance may be achieved by determining the load distribution features of the control cluster of the smart gas data center, thereby improving the operation efficiency of the smart gas data center.

Some embodiments of the present disclosure provide a device for operation and management of a smart gas data center. The device may comprise a processor configured to implement the method for operation and management of the smart gas data center in any embodiment of the present disclosure.

Some embodiments of present disclosure provide a non-transitory computer-readable storage medium, comprising computer instructions that, when read by a computer, direct the computer to perform the method for operation and management of the smart gas data center in any embodiment of the present disclosure.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of +20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for operation and management of a smart gas data center, implemented by at least one processor of an Internet of Things system for operation and management of the smart gas data center, wherein the Internet of Things system includes a smart gas user platform, a smart gas service platform, a smart gas management platform, a smart gas sensor network platform, and a smart gas object platform which are connected in sequence, the smart gas user platform includes a terminal device, the smart gas service platform includes a first server, the smart gas management platform includes a gas business management sub-platform, a non-gas business management sub-platform, and the smart gas data center, the gas business management sub-platform includes a second server, the non-gas business management sub-platform includes a third server, the smart gas data center includes a storage device, the smart gas sensor network platform includes a communication network and a gateway, the smart gas object platform includes various types of gas pipeline network devices and monitoring devices, and the method comprising:

obtaining to-be-stored-gas data based on the smart gas object platform, wherein the to-be-stored-gas data refers to gas-related data that needs to be stored in the data center;

obtaining downstream user features corresponding to the to-be-stored-gas data based on the smart gas user platform, wherein the downstream user features refer to features related to gas users;

determining a data redundancy level of the to-be-stored-gas data based on the to-be-stored-gas data and the downstream user features, wherein the data redundancy level refers to features of a quantitative relationship between data blocks and redundant data blocks;

generating redundant data blocks of the to-be-stored-gas data based on the data redundancy level; and storing the to-be-stored-gas data and the redundant data blocks in at least one target region of the smart gas data center based on loading distribution features, wherein the loading distribution features refer to criteria of different sub-data centers for receiving data in a gas data processing task, wherein the gas data processing task includes at least one storage task of the to-be-stored-gas data; wherein the determining a data redundancy level of the to-be-stored-gas data based on the to-be-stored-gas data and the downstream user features includes:

determining a data type of the to-be-stored-gas data;

determining, based on the data type, a target data accessing volume of gas data in the smart gas data center with the data type within a second preset time, and determining a total data accessing volume of gas data in the smart gas data center with all types within the second preset time;

determining accessing frequency distribution features through a first prediction model based on the total data accessing volume, the target data accessing volume, and the downstream user features, the first prediction model being a neural network model, wherein the accessing frequency distribution features refer to probability distribution of accessing frequencies of the to-be-stored-gas data with different data types within a time period, wherein the first prediction model is obtained by training based on first training samples with first labels, the first training samples include a total accessing volume of sample data, an accessing volume of sample target data, and downstream user features corresponding to sample to-be-stored-gas data, the first labels include sample accessing probabilities corresponding to a plurality of sample accessing frequency intervals;

determining a gas data level based on the to-be-stored-gas data, the accessing frequency distribution features, and the downstream user features; and determining the data redundancy level based on the gas data level, an estimated retention time of the to-be-stored-gas data, and an estimated accessing frequency of the to-be-stored-gas data; wherein the estimated accessing frequency is related to a distribution of data processing features within a first preset time, and the data processing features are determined based on the gas data processing task.

2. The method of claim 1, wherein the determining a gas data level based on the to-be-stored-gas data, the accessing frequency distribution features, and the downstream user features includes:
determining a user importance level based on the downstream user features;
determining a risk degree of a gas pipeline based on gas pipeline data;
determining a risk degree of gas data based on the accessing frequency distribution features, wherein the risk degree of gas data refers to a probability of gas data abnormalities; and
determining the gas data level based on the user importance level, the risk degree of the gas pipeline, and the risk degree of data.

3. The method of claim 1, further comprising:
determining loading distribution features of a control cluster of the smart gas data center, the control cluster including at least one control node, and the control node being configured to access the smart gas data center.

4. A non-transitory computer-readable storage medium, comprising computer instructions that, when read by a computer, direct the computer to perform the method for operation and management of the smart gas data center of claim 1.

5. An Internet of Things (IoT) system for operation and management of a smart gas data center, comprising a smart gas user platform, a smart gas service platform, a smart gas management platform, a smart gas sensor network platform, and a smart gas object platform which are connected in sequence, the smart gas user platform includes a terminal device, the smart gas service platform includes a first server, the smart gas management platform includes a gas business management sub-platform, a non-gas business management sub-platform, and the smart gas data center, the gas business management sub-platform includes a second server, the non-gas business management sub-platform includes a third server, the smart gas data center includes a storage device, the smart gas sensor network platform includes a communication network and a gateway, the smart gas object platform includes various types of gas pipeline network devices and monitoring devices; and
the smart gas management platform is configured to:
obtain to-be-stored-gas data based on the smart gas object platform, wherein the to-be-stored-gas data refers to gas-related data that needs to be stored in the data center;
obtain downstream user features corresponding to the to-be-stored-gas data based on the mart gas user platform, wherein the downstream user features refer to features related to gas users;
determine a data redundancy level of the to-be-stored-gas data based on the to-be-stored-gas data, the downstream user features, and loading distribution features, wherein the data redundancy level refers to features of a quantitative relationship between data blocks and redundant data blocks, wherein the loading distribution features refer to criteria of different sub-data centers for receiving data in a gas data processing task, wherein the gas data processing task includes at least one storage task of the to-be-stored-gas data;
generate redundant data blocks of the to-be-stored-gas data based on the data redundancy level; and
store the to-be-stored-gas data and the redundant data blocks in at least one target region of the smart gas data center based on the loading distribution features; wherein the determining a data redundancy level of the to-be-stored-gas data based on the to-be-stored-gas data and the downstream user features includes:
determining a data type of the to-be-stored-gas data;
determining, based on the data type, a target data accessing volume of gas data in the smart gas data center with the data type within a second preset time, and determining a total data accessing volume of gas data in the smart gas data center with all types within the second preset time;
determining accessing frequency distribution features through a first prediction model based on the total data accessing volume, the target data accessing volume, and the downstream user features, the first prediction model being a neural network model-, wherein the accessing frequency distribution features refer to probability distribution of accessing frequencies of the to-be-stored-gas data with different data types within a time period, wherein the first prediction model is obtained by training based on first training samples with first labels, the first training samples include a total accessing volume of sample data, an accessing volume of sample target data, and downstream user features corresponding to sample to-be-stored-gas data, the first labels include sample accessing probabilities corresponding to a plurality of accessing frequency intervals;
determining a gas data level based on the to-be-stored-gas data, the accessing frequency distribution features, and the downstream user features; and
determining the data redundancy level based on the gas data level, an estimated retention time of the to-be-stored-gas data, and an estimated accessing frequency of the to-be-stored-gas data; wherein
the estimated accessing frequency is related to a distribution of data processing features within a first preset time, and the data processing features are determined based on the gas data processing task.

* * * * *